J. H. BAKER.
MACHINE FOR MAKING CHAIN LINKS.
APPLICATION FILED JAN. 4, 1912.

1,032,365.

Patented July 9, 1912.
7 SHEETS—SHEET 1.

Fig.1.

WITNESSES

INVENTOR

J. H. BAKER.
MACHINE FOR MAKING CHAIN LINKS.
APPLICATION FILED JAN. 4, 1912.

1,032,365.

Patented July 9, 1912.

WITNESSES

INVENTOR
Jas. H. Baker,

J. H. BAKER.
MACHINE FOR MAKING CHAIN LINKS.
APPLICATION FILED JAN. 4, 1912.

1,032,365.

Patented July 9, 1912.

J. H. BAKER.
MACHINE FOR MAKING CHAIN LINKS.
APPLICATION FILED JAN. 4, 1912.

1,032,365.

Patented July 9, 1912.

WITNESSES
R. A. Balderson
W. Tamariss

INVENTOR
Jas. H. Baker,
by Bakewell, Bymer Parmelee,
Attys.

J. H. BAKER.
MACHINE FOR MAKING CHAIN LINKS.
APPLICATION FILED JAN. 4, 1912.

1,032,365.

Patented July 9, 1912.

WITNESSES

INVENTOR

J. H. BAKER.
MACHINE FOR MAKING CHAIN LINKS.
APPLICATION FILED JAN. 4, 1912.

1,032,365.

Patented July 9, 1912.

WITNESSES
R A Balderson
W Famariss

INVENTOR
Jas. H. Baker,
by Bakewell, Byrnes Parmelee.
Attys.

UNITED STATES PATENT OFFICE.

JAMES H. BAKER, OF PITTSBURGH, PENNSYLVANIA.

MACHINE FOR MAKING CHAIN-LINKS.

1,032,365.             Specification of Letters Patent.        Patented July 9, 1912.

Application filed January 4, 1912. Serial No. 669,479.

*To all whom it may concern:*

Be it known that I, JAMES H. BAKER, of Pittsburgh, Allegheny county, Pennsylvania, have invented a new and useful Machine for Making Chain-Links, of which the following is a full, clear, and exact description, reference being had to the accompanying drawings, forming part of this specification, in which—

My invention has relation to machines for making chain links, and more particularly to machines for shaping the welding ends or laps of the links although it may be used for making upset bends in other metal articles.

The invention is designed to provide a machine of this character having simple and efficient means for bringing the welding ends or laps of the link into the right relations for welding; and also to provide such a machine with a hammer mechanism of novel character for more efficiently welding the links.

My invention also provides means whereby chain links may be formed or welded in such a manner as to be as strong at the ends of the welded laps as elsewhere. I accomplish this by the provision of bending or forming means of a character which will not only bring the welding ends or laps into the correct position for welding, but which will also effect an upsetting of such ends or laps whereby a sufficiency of metal is provided at the welding point, and the metal is so disposed as to greatly facilitate the formation of the present weld.

The nature of my invention will be better understood by reference to the accompanying drawings, in which I have shown the preferred embodiment thereof, and which will now be described, it being premised, however, that various changes can be made in the details of construction and arrangement of the parts by those skilled in the art without departing from the spirit and scope of my invention as defined in the appended claims.

In these drawings, the numeral 2 designates the frame of the machine, which is provided with suitable bearings 3 for the support of a transverse power shaft 4, which may be driven by any suitable means such as the belt pulley 5 fixed thereto. One end portion of the shaft projects laterally beyond this belt pulley, as shown at 6, and has mounted thereon a sliding yoke 7 with pins or studs 8 which slidingly engage openings in the pulley 5. The yoke 7 has rigidly attached thereto a clutch member 9, which is adapted to be moved into and out of clutch engagement with a coöperating clutch member 10 which is loosely mounted on the shaft extension 6. This clutch member 10 is carried by a sleeve 11, loosely surrounding the end portion of the shaft extension 6 and which carries at its outer end a crank arm 12.

13 designates a treadle lever having actuating connections 14 by means of which the yoke 7 and its clutch member 9 may be moved into and out of driving engagement with the clutch member 10. Mounted on the central portion of the shaft 4 is a hammer-actuating cam 15.

16 is the hammer arm pivoted to the frame of the machine at 17 and having a bracket 18 secured to its under side and which coacts with the cam 15.

19 is the hammer; and 20 the welding anvil.

Figure 2:
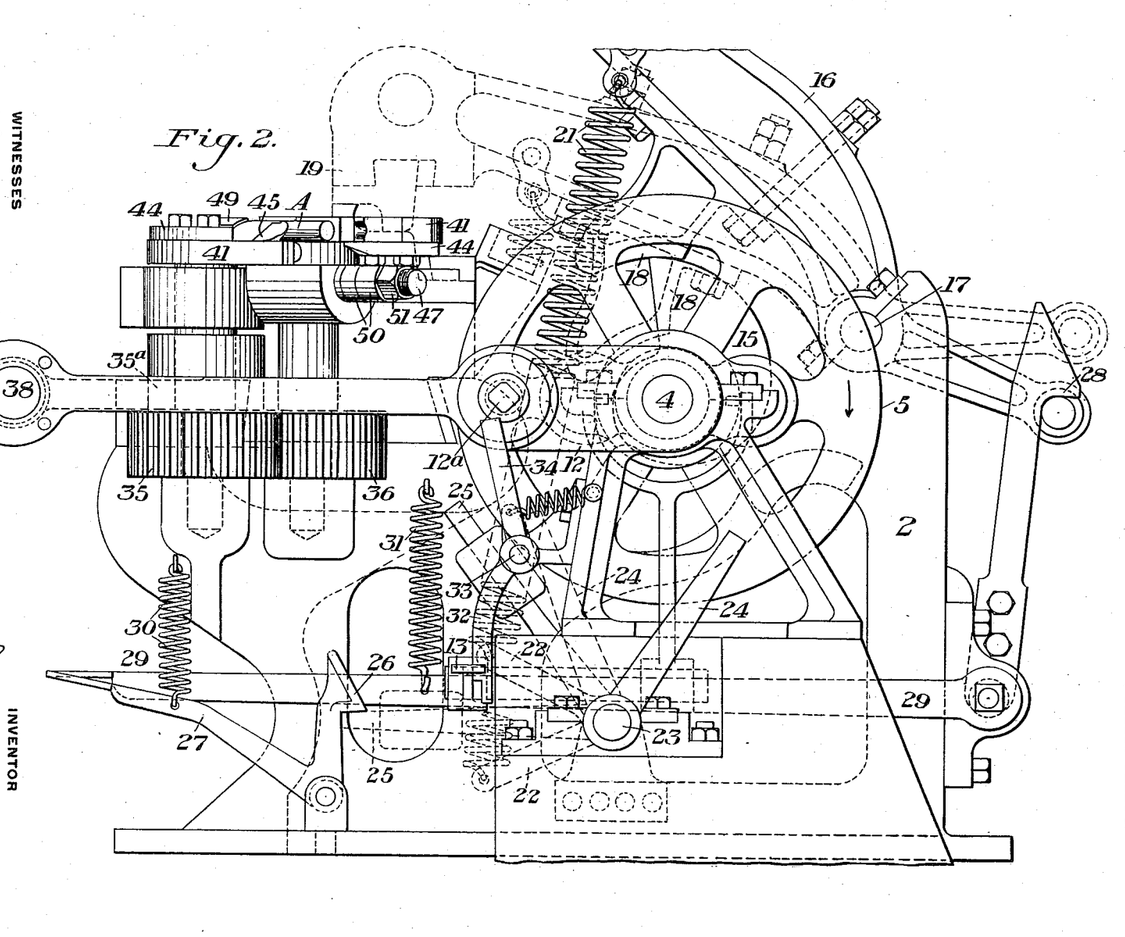
Fig. 2 is a side view of the same.

21 designates springs which are attached to the hammer arm at one end, and at their opposite ends are connected to arms 22 on the rock shaft 23 at the base of the machine. On one end of this rock shaft is an upwardly projecting arm 24, which extends into the path of rotation of the end of the crank pin 12ᵃ carried by the crank 12, whereby the rotation of said crank in the direction indicated by the arrow in Fig. 2, will, at the proper time, bring the crank pin into engagement with the upper end portion of the arm 24 and move said arm from the position shown in full lines in Fig. 2, to the position shown in dotted lines in said figure, thereby putting the springs 21 under increased tension. During and just before this movement the hammer 19 is generally resting in its upper position with the springs in tension. The movement of the arm 24 actuates the rock shaft 23; and this shaft has attached thereto a weighted momentum arm 25, which, by the movement of the shaft 23, is carried into position to be engaged by a latch 26 on a foot or treadle lever 27, thus holding the springs under the increased tension; the hammer generally having been held in its raised position by a catch or latch 28 actuated by the treadle lever 29. The welding now goes on with the power of the strokes at the predetermined maximum, but after the welding part comes nearly to the desired size the increased tension is let out of the springs 21, 21 by means of the treadle 27. The treadle 13 is arranged to be held in its depressed position by means of a latch arm 32. This latch arm is carried by a rocker shaft 33, having an upwardly projecting arm at 34 which is also in the path of the crank pin projection 12ᵃ to be engaged by said projection after the latter has released the arm 24. This engagement will release the treadle, and under the action of its spring the treadle will assume its normal position, thereby throwing the clutch out of engagement after one complete revolution of the shaft 4. 30 is a return spring for the treadle 27, and 31 is the return spring for the treadle 29. Rotatably mounted on the frame of the machine at one end thereof and at one side of the anvil, are two intermeshing spur wheels 35 and 36.

Figure 1:
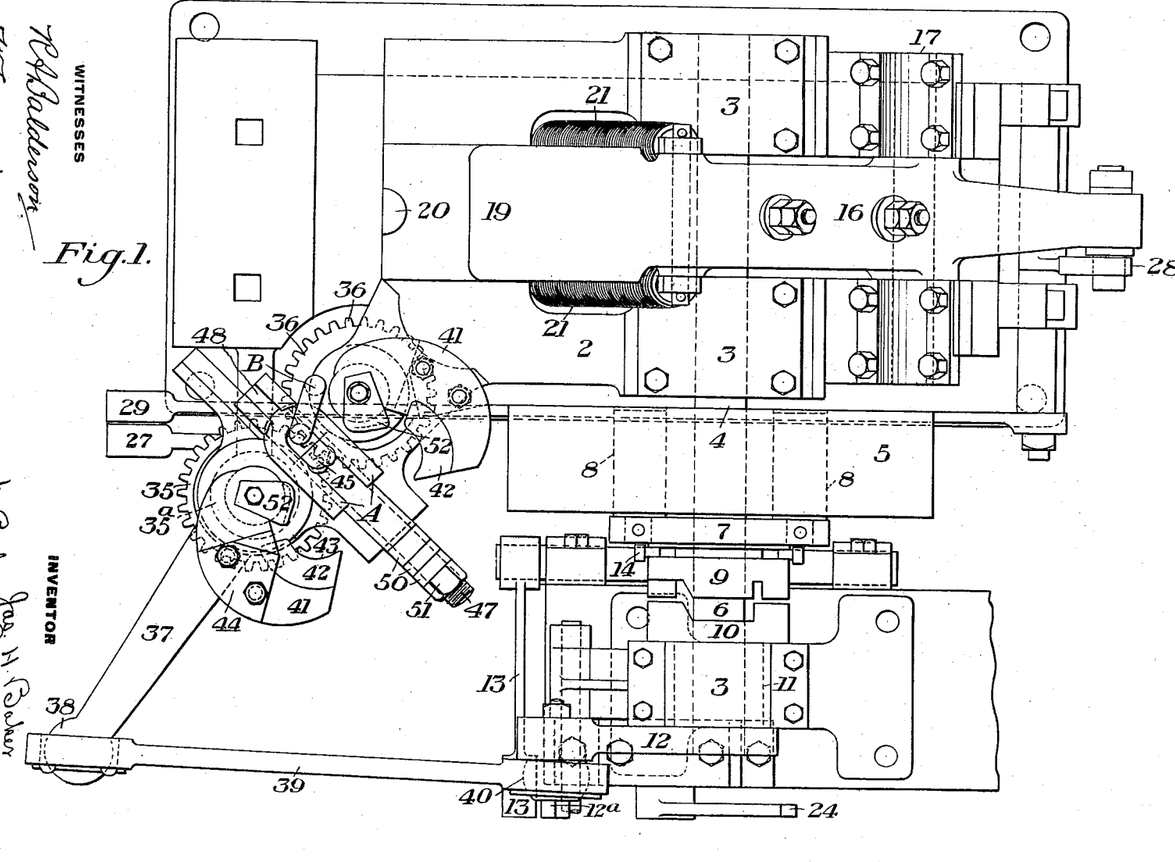
Figure 1 is a plan view of a machine embodying my invention.
Figure 4:
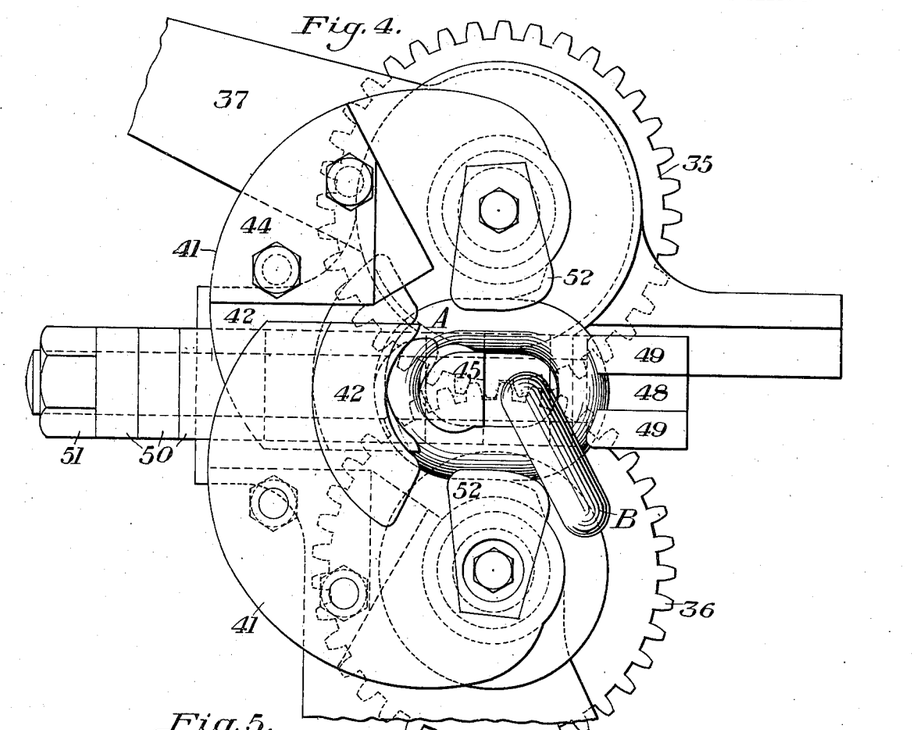
Fig. 4 is a plan view on a larger scale of the bending device and their actuating gears.
Figure 5:
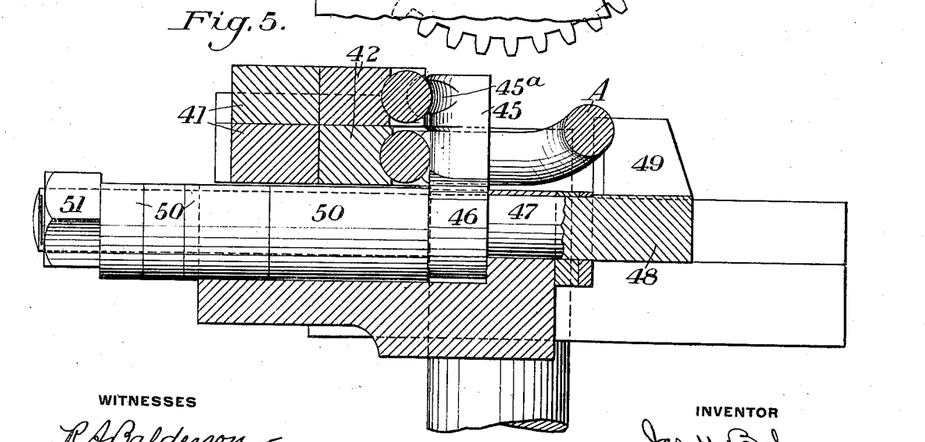
Fig. 5 is a sectional view of the same.
Figure 6:
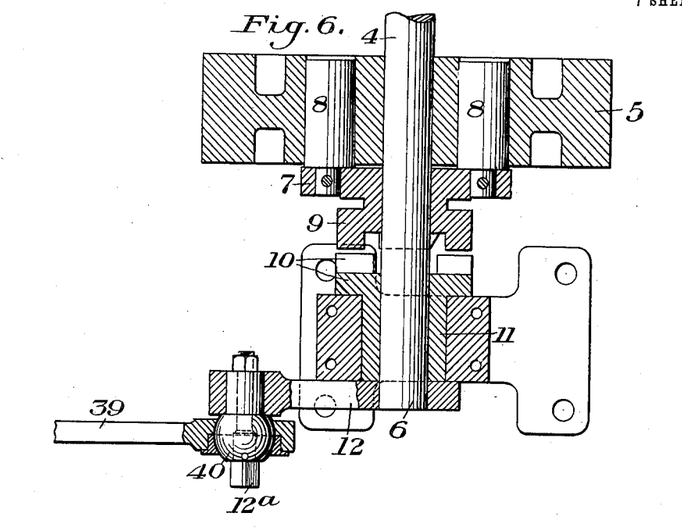
Fig. 6 is a sectional view showing the clutch mechanism.
Figure 7:
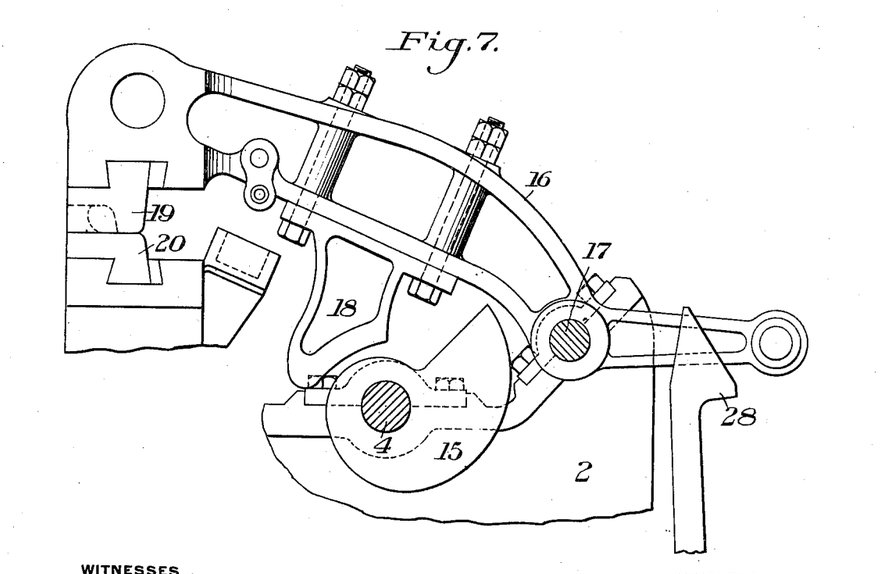
Fig. 7 is a detail view showing the hammer and its lifting cam.
Figure 8:
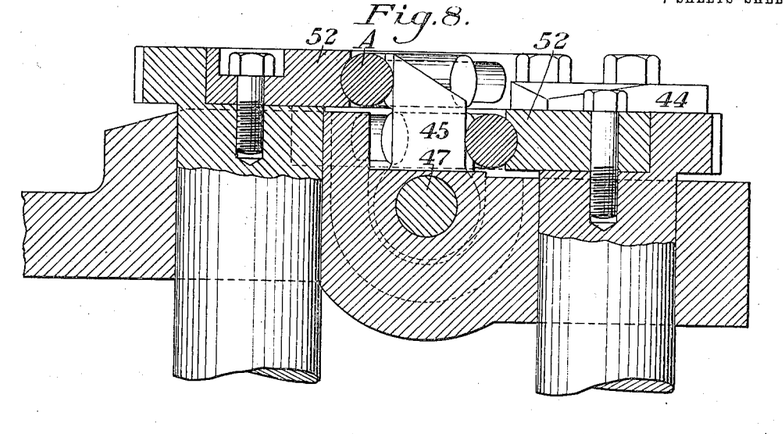
Fig. 8 is a sectional view showing the bending and forming devices with a formed link in place therein.

37 is a crank arm, which is rigidly connected with the hub 35ᵃ of the gear wheel 35 at one end, and which at its opposite end has a ball and socket connection 38 with a pitman 39 having a ball connection at 40 with the crank pin 12ᵃ. The ball connections at 38 and 40 permit sufficient movement of the pitman to accommodate the angular movement of the lever arm 37. Rigidly secured to the upwardly projecting shaft of each of these gear wheels is a curved die carrier 41. Secured to each of these die carriers is a bending die 42, these dies being arranged as best shown in Figs. 1 and 4. Each of these dies 42 has a grooved bending face 43, and is formed with a portion 44, preferably integral therewith, by means of which it is bolted to its carrier.

Figure 3:
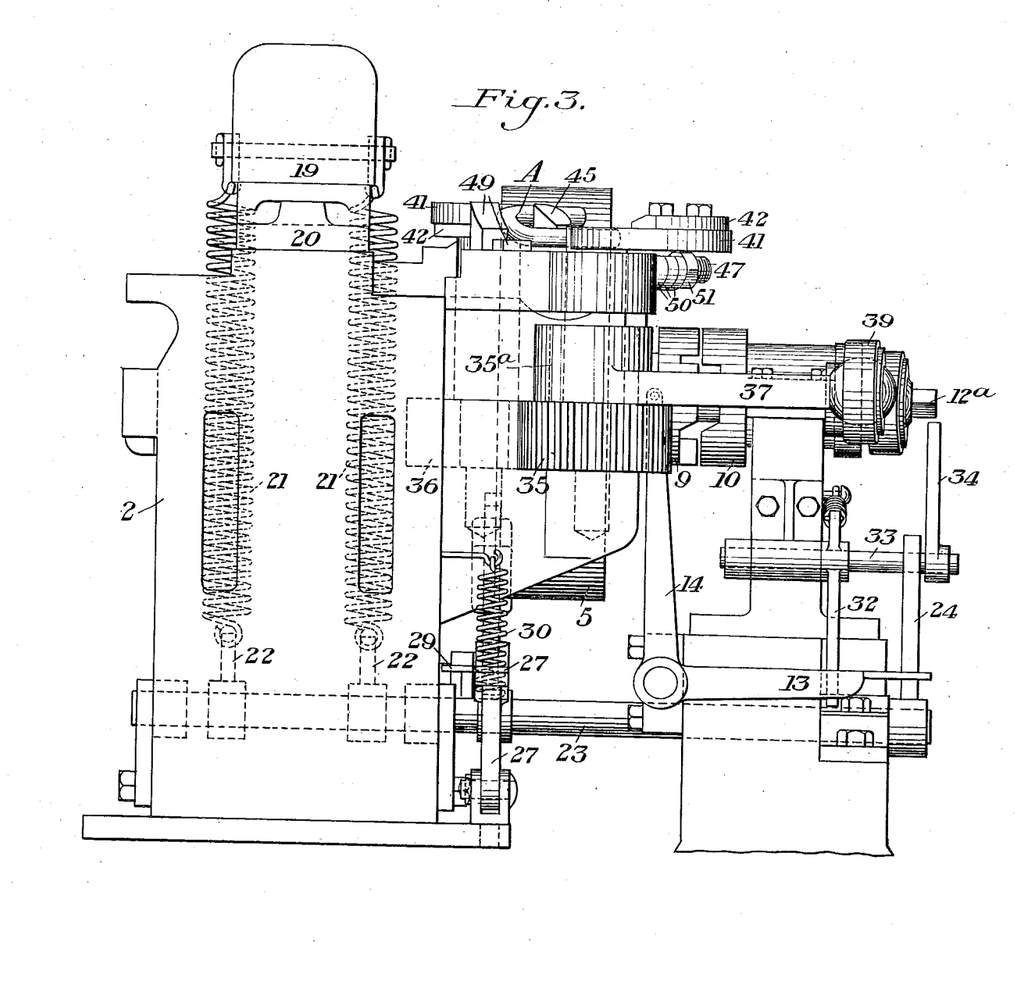
Fig. 3 is a front elevation.
Figures 9, 10, 11, 12, 13, 14:
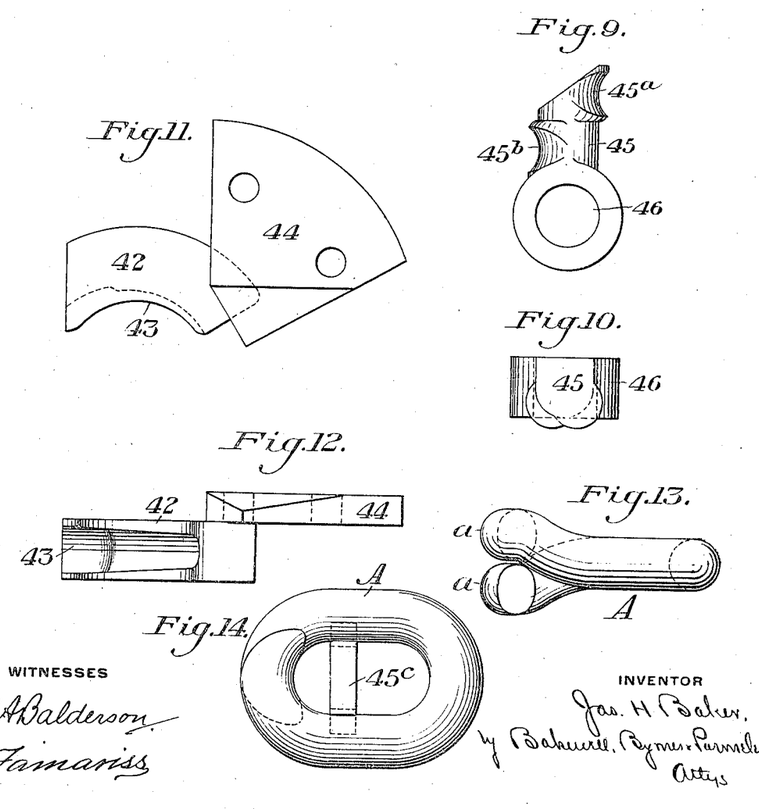
Figs. 9 and 10 are detail views of the mandrel which is used when link blanks having the form shown in Fig. 15 are employed.
Fig. 11 is a plan view of one of the bending dies and its attached carrying piece.
Fig. 12 is an end view of the same.
Fig. 13 is a side view of one form of shaped link ready for welding.
Fig. 14 is a plan view of a link and illustrating the use of a spacing post instead of a mandrel, during the bending operation.

45 designates a mandrel, which has a sleeve 46 at its lower end engaging the bolt 47 of a back stop 48. This back stop 48 has the upward projections 49, which receive the rear end of the link whose forward ends are to be formed. A number of filler blocks 50 are mounted on the bolt 47 between the sleeve 46 of the mandrel 45, and a securing nut 51 on the end of said bolt. These filler pieces are removable, and by the use of proper pieces any desired adjustment of the mandrel relatively to the heel projections 49 can be obtained to suit different sizes or lengths of links, and also any desired adjustment of the mandrel 45 relatively to the centers around which the die carriers 41 with the dies 42 move. The mandrel 45 is formed at opposite sides with the grooves 45ᵃ and 45ᵇ, as shown in Fig. 9, when it is to be used for closing and placing the laps of links like Figs. 15 and 16; but when to be used for bending the ends and upsetting them at the same time, a simple spacing post (Fig. 14) will answer, as no mandrel is needed. Adjustably secured to the shaft of each of the gear wheels 35 and 36 above the die carriers is a gripper 52. These grippers are arranged to grip the outer sides of the legs of the link in the manner presently described. The two die carriers and bending dies are arranged in different horizontal planes so as to pass one underneath the other when they are closed upon the link. The mandrel which supports the link is adapted to hold it in a somewhat oblique position, as shown at A in Fig. 3, the bent end of the link engaging the heel projections 49, and the mandrel or spacing post 45 extending upwardly within the bend of the link.

The operation when the ends of a link are to be bent and upset at the same time is as follows:—The link A which has previously been bent to U-form, and which is properly heated, and which is engaged with a previously formed link B (see Fig. 1), is inserted into position astride of the mandrel just described. The operator then depresses the treadle 13 to throw the clutch and produce a rotation of the crank arm 12. This rotation of the crank arm, through the pitman 39 and lever arm 37, actuates the gear wheels 35 and 36 to close the die carriers and dies 42 from the open position shown in Fig. 1 to the closed position shown in Fig. 4. As the rear wheels 35 and 36 commence to rotate, and the die carriers and dies to move inwardly, the grippers 52 engage the outer sides of the legs of the link, and press them toward and against the mandrel, and also force the link backwardly against the heel projections 49. Further closing movement of the dies brings their inner faces into engagement with the end portions of the legs of the link, thereby bending them inwardly into a position where their welding end portions $a$—$a$ lie one directly over the other. As the crank pin $12^a$ passes the center, the direction of movement of the lever arm 37 is reversed, thereby opening the die carriers and dies into position to permit of the removal of the formed blank and the insertion of a new blank. The formed blank is then, preferably without reheating, transferred to the anvil underneath the hammer and is welded, the entire bending and welding operations being preferably carried out in one heat of the metal.

The bending operations above described cause the metal to be upset at the welding ends of the link; and by reason of the positions into which these welding ends are bent by the dies, as above described, the welding operation is performed without reducing the section of the link at the ends of the laps below that of the body of the link.

The upsetting of the welding ends or laps of the link in the manner above described is produced by certain relations existing between the mandrel, or the inside center of the finished link, and the bending and upsetting dies. This arrangement is more clearly illustrated by the diagram of Fig. 17. Assuming that it is desired to make a link of the common commercial width, which is about 160 per cent. of the diameter of the bar from which it is made, the die pivots should be so placed that the distance $a$—$b$ measured from the pivotal center of each die carrier to the longitudinal central line of the finished link will be equal to about three and a quarter diameters of the bar; and the distance $b$—$c$, which is measured from the center of the inner curve of the link to the line $a$—$b$ should be equal to about two diameters of the bar. The distance $d$—$d$ measured from the initial point of contact between the bending die and the leg of the link and a line which is tangent to the point $c$ on the inner curve of the link is preferably about equal to two and a quarter diameters. These dimensions may, of course, be changed within certain limits, according to the amount of upsetting which is desired to give the link, and will also vary with the size and form of the link; but they indicate in general the proportionate relationships which should be approximately maintained. That is to say, in general, the distance $a$—$b$ should be about 60 per cent. greater than the distance $b$—$c$.

Figure 17:
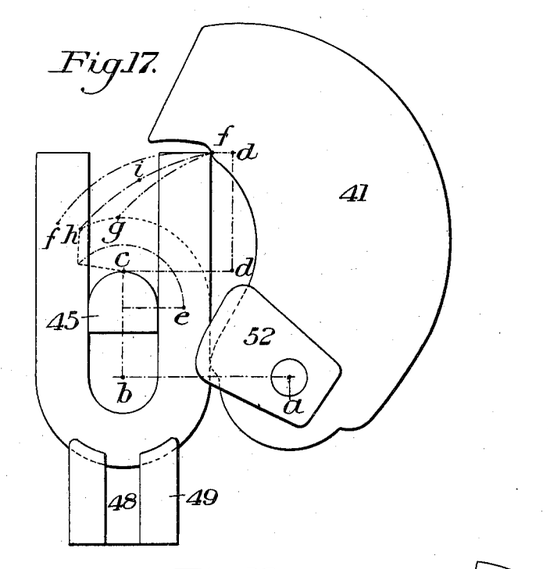
Fig. 17 is a diagrammatic view illustrating the bending operation.

The natural bending curve of the end of the link from the tangent point $e$ is indicated by the curve $f$—$f$; but owing to the fact that the end of the link is engaged and held by the die at the initial contact point on the die, the upper outer corner of the leg would, theoretically, follow the curved line $f$—$g$. Inasmuch, however, as the die will slightly crush the blank at the point of contact this contact point of the blank will actually travel on about the line $f$—$h$. It will be seen that this line is of considerably shorter radius than the line $f$—$f$. Therefore, the ends of the link in bending must either force the sides of the link outwardly, or must shorten by upsetting, and as the sides of the link are held against outward movement by the dies 52, the ends of the link are compelled to upset to an amount approximately equal to the distance between the lines $f$—$f$ and $f$—$h$. The link is, of course, held against any backward movement by means of the back stop. Having established the pivotal points for the dies, this point may be moved toward the end of the blank or away from it considerably without affecting the efficiency of the machine, provided that it is moved about on the line $a$—$i$ drawn from this center to a point on the curve $f$—$h$ about midway of the ends of the latter. If it is desired to have more upsetting than is allowed for in the proportions just given, then the pivotal point of the die carrier can be moved outwardly on the radius of the curve $a$—$i$. On the other hand, if less or no upsetting is required, the pivotal center of the die carrier can be moved inwardly on this line. It will also be apparent that if the machine is built with the pivotal points of the die carriers at a fixed distance from each other, the relationships may be changed by moving the adjustable spacing post or mandrel and the back stop forward or back, and by changing the form of the die carrier and die to correspond to the relations wanted. Because of the relationships of the centers just described, the ends of the link blank are not pressed against the mandrel 45, and are therefore, not hurt or injured as is common in such operations.

It will be noted that the dies have projecting end portions forward of their engaging points, and which overhang the ends of the blanks, their inner faces extending at substantially right angles to the line of the blank at the commencement of the bending operation. This feature is found to be an important one in producing the desired upsetting action, since these overhanging portions of the dies serve to confine the metal of the blank between them and the back stop; and as the die swings inwardly the distance between these overhanging portions and the back stop decreases. This gives a very different action to the die than that which would result from a mere side engagement of the die with the link blank.

Figure 15:
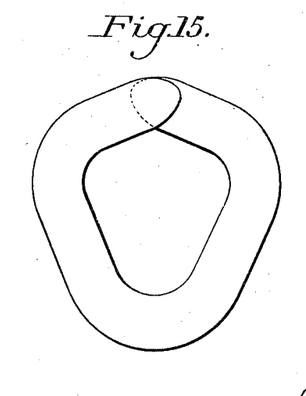
Fig. 15 is a plan view illustrating another form of link blank.
Figure 16:
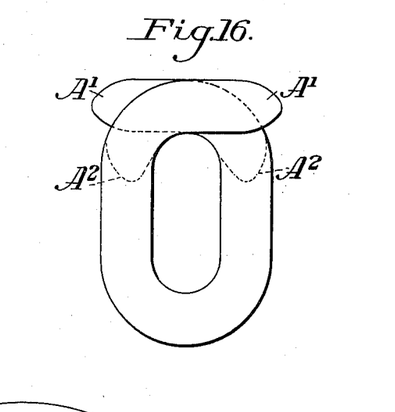
Fig. 16 is a similar view showing the blank of Fig. 15 in a form which it assumes during the bending operation.

In Fig. 14, instead of the mandrel before described, I have shown a simple spacing post 45ᶜ. When using U-shaped blanks, in most cases it is unnecessary to provide any mandrel or forming surface around which the bending is effected, since, as a matter of fact, the tendency of the sides of the link is to press outwardly against the dies 52 instead of inwardly against a spacer or mandrel, and the correct form of the ends of the link is determined by the dies. In using the spacing post instead of the mandrel, there is no cold metal to touch the inside of the link and chill it at a point where it is to be welded, and this materially facilitates the making of a good weld. In fact, even the spacing post would not be required when making links from U-shaped blanks, with only the forward part of the blank well heated, if these blanks were of uniform length at their ends so that both the dies 42 would engage the links simultaneously. But in cases where one end is longer than the other, the spacing post prevents the link from being thrown to one side; although, even in cases of unequal length, the dies 42, in their initial travel, tend to bring the link back to its central position. Instead of the dies 52, I may employ other suitable side holding means or clamps. If the blanks were all bent to uniform shape, it is obvious that fixed stops would answer the purpose. Instead of starting with the U-shaped blank, I may use a blank of the shape of Fig. 15. For such blank I employ a mandrel 45, and the grippers 52 will close this blank to the shape of Fig. 16, while the bending dies will bring the ends A', A' around the mandrel to the position of A², A². This brings the laps as far back as may be desired, the blank shown in Fig. 15 having been formed to suit. In shaping the link shown in Figs. 15 and 16, the shape of the bending dies where they come in contact with the blank, determines the exact position of the laps A', A². I do not claim that the operation on the blank as shown in Figs. 15 and 16 just described, will upset the ends, as in the case of the U-shaped blank, but I do claim that the machine will quickly and properly place the lap ends of the link as far back on the sides of the link as may be desired, and this is important for certain kinds of chains.

Figure 18:
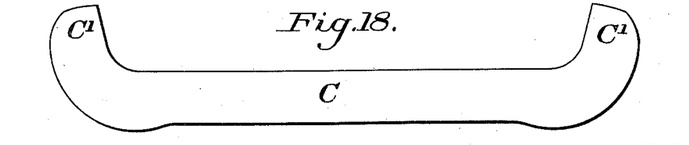
Fig. 18 is a plan view showing another way of forming a link.

In heavy chain work, I deem it advisable when bending the blanks into their initial U-shape, to scarf their ends, although I have made links by my improved method without scarfing which in testing showed more strength than expensive hand-made links in the same grade of material. For some kinds of links, such as used in heavy cables for ships, it may be desirable under certain conditions (as where a separate hammer is used for welding, or hand-welding is employed), to form the laps and upset the material at the ends separately on each end of a straight bar blank, and afterward bend this blank. This is indicated in Fig. 18, where the ends of the bar of the blank C have been bent and upset to form the welding laps C', which are subsequently brought into welding relation by bending the blank centrally upon itself. It will be readily understood that the formation of the ends C' can be readily effected by the use of one of the die carriers and dies of the machine described. It will be understood that the operator starts the machine by placing his foot on the treadle 13, thereby throwing in the controlling clutch as before described. After the shaft 3 has made one complete revolution, the clutch will be automatically thrown out by the release of the latch 32. The hammer is normally held in its raised inactive position by means of the latch 38, but can be brought into operation at any time by depressing the treadle 29 and thereby releasing said latch. In order to weld the links properly and rapidly, and to finish them nicely, the hammer may be made to give heavy blows in the start of the operation, and then, without stopping or changing its speed, the hammer blows may be reduced sufficiently so that light finishing blows are delivered. In this manner power is saved, and also a large amount of wear and tear on the hammer and dies.

It will be obvious that the details of the machine may be widely changed within the scope of the appended claims without departing from my invention.

I claim:—

1. In a machine for making chain links, a holder for the link blank and a pivoted die carrier and die, the latter having an engaging point for an end of the blank which is movable through an arc of less radius than the natural bending arc of the blank end, whereby said end is upset as it is bent by the die, said holder comprising means for securing the blank from movement both laterally and longitudinally while it is being bent and upset; substantially as described.

2. In a machine for making chain links, a holder for the link blank and a pivoted die carrier and die, the latter having an engaging point for one end of the blank which is movable through an arc of less radius than the natural bending arc of the blank end, whereby said end is upset as it is bent by the die, said holded including means for engaging the blank laterally to hold the same against undue side movement, together with a back stop for holding the blank against backward movement under the action of the die; substantially as described.

3. In a machine for making chain links, a holder for the link blank and a pivoted die carrier and die, the latter having an engaging point for an end of the blank which is movable through an arc of less radius than the natural bending arc of the blank end, whereby said end is upset as it is bent by the die, said holder including means for preventing outward movement of the sides of the blank as it is bent by the die and also for preventing backward movement of the blank; substantially as described.

4. In a machine for making links, a pair of pivoted bending dies arranged to engage opposite ends of an open-end link blank, and means for simultaneously actuating said dies, said dies having blank-engaging points whose arcs of movement are of less radii than the natural bending arcs of the blank ends together with means for holding the blank both laterally and longitudinally while the dies are acting thereon; substantially as described.

5. In a machine for making links, a pair of pivoted bending dies arranged to engage opposite ends of an open-end link blank, and means for simultaneously actuating said dies, said dies having blank-engaging points whose arcs of movement are of less radii than the natural bending arcs of the blank ends, together with means for holding the opposite end of the blank and the sides thereof during the bending operation; substantially as described.

6. In a machine for forming chain links, a blank support having a back stop, and a spacer, together with means for adjusting the back-stop and the spacer relatively to each other; substantially as described.

7. In a machine for bending chain links, a blank support for an open end blank, and having a back stop, a pair of pivoted die carriers arranged at opposite sides of the support, dies mounted on said carriers and having blank-engaging points which travel in arcs of less radii than the natural bending arcs of the blank, and side grips secured to the die carriers and arranged to press against the opposite sides of the blank during the bending operation; substantially as described.

8. In a machine for forming chain links from open-end blanks, a pair of intermeshing gear wheels, a die carrier rigidly attached to the shaft of each gear wheel, a support for an open-end blank having a back stop mounted between the die carriers, means for holding the blank against lateral spreading, and actuating means connected to one of the gear wheels; substantially as described.

9. In a machine for forming chain links, the combination of a rotating shaft having a crank member, a pitman connected to the crank member, a pair of intermeshing gear wheels, a lever arm connected to one of the gear wheels and to said pitman, and a die carrier actuated by each gear wheel, together with a clutch for controlling the connection between the shaft and the crank member, and means for automatically throwing the clutch out at a predetermined time; substantially as described.

10. In a machine for forming chain links, the combination of a back-stop for the blank, and means for holding the blank against lateral spreading, of a pivoted die carrier and die, said die having a blank-engaging and bending point which is movable through an arc of less radius than the natural bending arc of the blank; substantially as described.

11. In a machine for forming chain links, a pair of pivoted bending dies, a back stop, and means for pressing inwardly against the sides of an open-end link blank and at the same time forcing the blank back against the back stop while the bending operation goes on; substantially as described.

12. In a machine for making chain links, a holder for the link blank and a pivoted die carrier and die, the latter having an engaging point for an end of the blank, which is movable through an arc of less radius than the natural arc of the blank end, whereby said end is upset as it is bent by the die, a back stop for holding the blank against backward movement under the action of the die, together with means for pressing against the side of the link as it is being bent by the die; substantially as described.

13. In a machine for making chain links, a pivoted die-carrier and die, the latter having an engaging point for an end of the blank which is movable through an arc of less radius than the natural bending arc of the blank, whereby said end is upset as it is bent by the die, together with a mandrel adjustable with relation to the pivotal point of the die carrier; substantially as described.

14. In a machine for making chain links, a pivoted die-carrier and die, the latter having an engaging point for an end of the blank which is movable through an arc of less radius than the natural bending arc of the blank, whereby said end is upset as it is bent by the die, together with a back stop which is adjustable with relation to the pivotal point of the die carrier; substantially as described.

15. In a machine for making chain links, means for holding against the side of a link blank, a pivoted bending die carrier, and a back stop for supporting the end of a link blank, said back stop being adjustable with relation to the pivotal point of the bending die carrier to thereby bring the forward end of the link blank in such relation to the pivot of the bending die that its operation in bending the end of the link blank to the correct form as determined by the dies, will force the side of the link blank outwardly against said holding means; substantially as described.

16. In a machine for forming the ends of open-end chain link blanks by a combined bending and upsetting operation, a pivoted bending die having an engaging point for an end of the blank which is movable through an arc of less radius than the natural bending arc of the blank end, whereby said end is upset as it is bent, a spacing post for the blank, a back stop for the blank, and means for holding the sides of the blank from being forced outwardly during the bending operation; substantially as described.

17. In a machine for forming upset bends, a holder for the blank, a pivoted die carrier and die with the forward part of the face of said die arranged to extend over the end of said blank at about right angles to the center line of the blank as the operation commences, the die having an engaging point for the end of the blank which is movable through an arc of less radius than the natural bending arc of the blank end, whereby said end is upset as it is bent by the die, with means for engaging the blank laterally to hold the same against undue side movement; substantially as described.

18. In a machine for forming upset bends, a back stop holder for the U-blank, a pair of pivoted die carriers and dies, means for simultaneously actuating said dies with the forward parts of said dies arranged to extend over the ends of the said blank at about right angles to the center line of the blank as the operation commences, and means for preventing the sides of said blank from spreading sidewise, whereby the ends of the blank are upset as they are bent by the dies; substantially as described.

19. In a machine for forming upset bends, a blank holder back stop, a pivoted die carrier and die, the forward part of the face of said die arranged to extend over the end of said blank at about right angles to the center line of the blank as the operation commences, whereby said end is upset as it is bent by the die, with means for engaging the blank laterally to hold the same against undue side movement; substantially as described.

20. In a machine for forming upset bends in U-shaped link blanks, a back stop holder for the U blank, a pair of pivoted die carriers and dies, means for simultaneously actuating said dies, the forward parts of said dies arranged to extend over the end of the said blank at about right angles to the lines of the blank as the operation commences, the dies having engaging points for the ends of the blank which are movable through an arc of less radius than the natural bending arc of the blank ends, and means for preventing the sides of said blank from spreading sidewise, whereby the ends of the blank are upset as they are bent by the dies; substantially as described.

In testimony whereof, I have hereunto set my hand.

JAMES H. BAKER.

Witnesses:
GEO. H. PARMELEE,
H. M. CORWIN.